(12) United States Patent
Sakawaki et al.

(10) Patent No.: US 8,139,303 B2
(45) Date of Patent: Mar. 20, 2012

(54) METHOD FOR PRODUCTION OF MAGNETIC RECORDING MEDIUM, MAGNETIC RECORDING MEDIUM AND MAGNETIC RECORDING AND REPRODUCTION DEVICE

(75) Inventors: Akira Sakawaki, Ichihara (JP); Masato Fukushima, Ichihara (JP)

(73) Assignee: Showa Denko K.K., Tokyo (JP)

( * ) Notice: Subject to any disclaimer, the term of this patent is extended or adjusted under 35 U.S.C. 154(b) by 179 days.

(21) Appl. No.: 12/441,862

(22) PCT Filed: Sep. 11, 2007

(86) PCT No.: PCT/JP2007/068019
§ 371 (c)(1),
(2), (4) Date: May 20, 2009

(87) PCT Pub. No.: WO2008/035644
PCT Pub. Date: Mar. 27, 2008

(65) Prior Publication Data
US 2010/0020434 A1      Jan. 28, 2010

(30) Foreign Application Priority Data
Sep. 22, 2006 (JP) ................................ 2006-257153

(51) Int. Cl.
G11B 5/09 (2006.01)
G11B 5/596 (2006.01)
G11B 5/64 (2006.01)
B44C 1/22 (2006.01)
B05D 5/12 (2006.01)

(52) U.S. Cl. ........... 360/48; 360/77.02; 216/22; 216/41; 427/130; 428/826

(58) Field of Classification Search .................. None
See application file for complete search history.

(56) References Cited

U.S. PATENT DOCUMENTS

| 7,067,207 B2 * | 6/2006 | Kamata et al. ............... 428/836 |
| 7,147,790 B2 | 12/2006 | Wachenschwanz et al. |
| 8,048,323 B2 | 11/2011 | Fukushima et al. |
| 2005/0036223 A1 | 2/2005 | Wachenschwanz et al. |

(Continued)

FOREIGN PATENT DOCUMENTS
JP    05-205257 A    8/1993
(Continued)

OTHER PUBLICATIONS

Edi Suharyadi, et al., "Fabrication of Patterned Co/Pd Nanostructures Using E-Beam Lithography and Ga Ion-Irradiation," IEICE Technical Report, MR2005-55 (Feb. 2006), pp. 21-26.

*Primary Examiner* — Daniell L Negron
*Assistant Examiner* — Regina N Holder
(74) *Attorney, Agent, or Firm* — Sughrue Mion, PLLC

(57) ABSTRACT

A method for the production of a magnetic recording medium includes the steps of forming a magnetic layer on a nonmagnetic substrate, injecting atoms into portions of the magnetic layer to cause the portions to be demagnetized or allowed to acquire amorphousness, thereby forming a magnetically separated magnetic recording pattern, the step of injecting atoms including the steps of applying to a surface of the formed magnetic layer an SOG film as a resist, partly removing or thinning the resist, and irradiating the surface with atoms, thereby partly injecting atoms into the magnetic layer through the portions of the magnetic layer from which the resist is removed or in which the resist is thinned.

8 Claims, 1 Drawing Sheet

| U.S. PATENT DOCUMENTS | | | | FOREIGN PATENT DOCUMENTS | | |
|---|---|---|---|---|---|---|
| 2005/0069732 A1* | 3/2005 | Kamata et al. ............ 428/694 TC | | JP | 2002-288813 A | 10/2002 |
| 2008/0293170 A1* | 11/2008 | Miyata et al. .................... 438/16 | | JP | 2004-164692 A | 6/2004 |
| 2009/0180213 A1 | 7/2009 | Fukushima et al. | | JP | 2004-178793 A | 6/2004 |
| 2009/0237838 A1 | 9/2009 | Fukushima et al. | | JP | 2004-178794 A | 6/2004 |
| 2009/0323219 A1* | 12/2009 | Fukushima et al. ............ 360/122 | | JP | 2006-164365 A | 6/2006 |
| 2010/0053797 A1 | 3/2010 | Fukushima et al. | | | | |
| 2010/0104852 A1* | 4/2010 | Fletcher et al. ............ 428/315.5 | | | | |

* cited by examiner

METHOD FOR PRODUCTION OF MAGNETIC RECORDING MEDIUM, MAGNETIC RECORDING MEDIUM AND MAGNETIC RECORDING AND REPRODUCTION DEVICE

CROSS REFERENCE TO RELATED APPLICATION

This application is an application filed under 35 U.S.C. §111(a) claiming the benefit pursuant to 35 U.S.C. §119(e)(1) of the filing date of Japanese Patent Application No. 2006-257153 filed Sep. 22, 2006 pursuant to 35 U.S.C. §111(b).

TECHNICAL FIELD

This invention relates to a magnetic recording medium for use as in a hard disk drive, a method for the production thereof, and a magnetic recording and reproduction device.

BACKGROUND ART

In recent years, as magnetic recording devices, such as magnetic disk drives, flexible disk drives and magnetic tape drives, have immensely expanded their ranges of utility and gained in significance, efforts have been directed toward enabling the magnetic recording media used in these drives to be prominently improved in recording density. Particularly, the increase in surface recording density has been further growing in ardency since the introduction of the Magnet-Resistive (MR) head and the Partial Response Maximum Likelihood (PRML) technique. Owing to the further introduction of the Giant-Magnet Resistive (GMR) head and the Tunneling Magneto Resistive (TMR) head in recent years, the increase is continuing at a pace of about 100% per year. These magnetic recording media are being urged to attain a still higher recording density in future and their magnetic recording layers to accomplish addition to coercive force, Signal to Noise Ratio (SNR) and resolution. Recent years have been witnessing efforts that are being continued with the object of enhancing the linear recording density and adding to the surface recording density by increasing the track density as well.

In the latest magnetic recording devices, the track density has reached 110 kTPI. As the track density is further increased, it tends to entail such problems as causing interference between the parts of data magnetically recorded in adjacent tracks and inducing the magnetization transition region in the borderline region to constitute a noise source and impair the SNR. This fact hinders the enhancement of the recording density because it immediately results in lowering the bit error rate.

For the sake of increasing the surface recording density, it is necessary that the individual recording bits on the magnetic recording medium be formed in as minute a size as possible and enabled to secure as large saturated magnetization and magnetic film thickness as permissible. As the recording bits further decrease in size, however, they tend to entail such problems as lessening the minimum volume of magnetization per bit and inducing extinction of recorded data through the magnetization reversal caused by thermal fluctuation.

Further, since the track pitch grows small, the magnetic recording device necessitates a tracking servo mechanism of extremely high accuracy and, at the same time, generally needs adoption of the method of executing the recording in a large width and executing the reproducing in a smaller width than during the recording with a view to eliminating the influence from the adjacent tracks to the fullest possible extent. Notwithstanding that this method is capable of suppressing the influence between the adjacent tracks to a minimum, it entails such problems as rendering sufficient acquisition of the output of reproduction difficult and consequently incurring difficulty in securing a sufficient SNR.

As one means to cope with the problem of thermal fluctuation and accomplish acquisition of a due SNR or a sufficient output, an attempt to enhance the track density by forming irregularities (concavities and convexities) along the tracks on the surface of the recording medium and consequently physically separating mutually the adjacent tracks is now under way. This technique will be referred to as a "discrete track method" and the magnetic recording medium that is produced by this technique will be referred to as a "discrete track medium" herein below.

As one example of the discrete track medium, a magnetic recording medium that is formed on a nonmagnetic substrate bestowed on the surface thereof with concavo-convex patterns and enabled to acquire physically separated magnetic recording track and servo signal pattern has been known (refer, for example, to JP-A 2004-164692).

This magnetic recording medium has a ferromagnetic layer formed on the surface of a substrate possessing a plurality of irregularities on the surface thereof via a soft magnetic layer and has a protective film formed on the surface of the ferromagnetic layer. This magnetic recording medium has formed in the convexed regions thereof magnetic recording regions magnetically divided from the environments.

According to this magnetic recording medium, it is held that a high-density magnetic recording medium issuing no great noise can be formed because the fact that the occurrence of magnetic walls in a soft magnetic layer can be suppressed results in preventing the influence of thermal fluctuation from readily appearing and allowing extinction of interference between the adjacent signals.

The discrete track method is known in two kinds, i.e. a method which forms a track subsequent to forming a magnetic recording medium consisting of a number of stacked thin films and a method which forms a thin-film magnetic recording medium either directly on the surface of a substrate or subsequent to forming concavo-convex patterns on a thin-film layer ready for the formation of a track (refer, for example, to JP-A 2004-178793 and JP-A 2004-178794). The former method, often called a magnetic layer processing type, is at a disadvantage in suffering the medium to be readily contaminated during the course of production and greatly complicating the process of production as well because it requires the physical processing of surfaces to be carried out subsequent to the formation of the medium. The latter method, often called an emboss processing type, though not inducing ready contamination during the course of production, is at a disadvantage in disabling stabilization of the posture and the height of floatation of the recording and reproducing head adapted to execute recording and reproducing while floating on the medium because the concavo-convex shape formed on the substrate is fated to continue existence on the film to be formed.

A method for forming regions between magnetic tracks of a discrete track medium by implanting nitrogen ions or oxygen ions into a magnetic layer formed in advance or irradiating the magnetic layer with a laser is disclosed (refer to JP-A HEI 5-205257). This prior art reference, however, has no description about the fact of installing a resist or a mask during the course of the implantation of ions. When the resist or mask is not installed, it is difficult to restrict the implantation of ions solely to the regions between the magnetic tracks.

Further, in the production of the so-called patterned medium having magnetic recording patterns disposed with a fixed regularity for each bit, the concept of forming the magnetic recording patterns by the etching with ion irradiation or by the impartation of amorphousness to the magnetic layer is disclosed (refer to Technical Report of IEICE, MR2005-55 (2006-02), pp. 21-26 (The Institute of Electronics, Information and Communication Engineers) and U.S. Pat. No. 6,331,364).

Though U.S. Pat. No. 6,331,364 reports an experiment of installing a mask on regions excepting the regions between the magnetic tracks on the magnetic layer and irradiating the magnetic layer with ions, it fails to mention Spin-On-Glass (SOG) as a mask.

As the mask directed to the ion implantation, an organic resist or a tooth hard mask that is obtained by coating the surface of a medium with a metal or an oxide layer of $SiO_2$ and processing the coated medium with an organic resist has been being used.

The mask of this kind, however, entails a problem in the following point.

The organic resist cannot manifest a sufficient shielding effect against the impact of ions of high energy used for the ion implantation because it has an unduly small density. It is incapable of imparting sufficient resistance (etching resistance) because it is destitute of bonding and is easily scattered by collision with ions.

By contrast, the mask that is produced by the incorporation of a layer of metal or oxide possesses shielding effect and resistance of certain level against the ion implantation. It, however, incurs such extra labor hour as in specially preparing a primary mask by using an organic resist and processing the layer of metal or oxide as a mask by dry etching. The labor hour is at a disadvantage in complicating the process and degrading the yield and the cost.

This invention is directed to a magnetic recording device facing a technical difficulty in consequence of the addition to the recording density and is aimed at greatly increasing the recording density while securing the recording and reproducing property equal to or better than the conventional product, and as well decreasing to the maximum the coercive force and the residual magnetization of the regions between the magnetic recording pattern parts, thereby eliminating the blurring that occurs during the magnetic recording and eventually increasing the recording density. Particularly concerning the discrete track magnetic recording medium that results from forming a magnetic layer as a film on a substrate and subsequently forming irregularities on the magnetic layer, this invention is aimed at providing a method for the production that remarkably simplifies the process of production and decreases the risk of contamination by excluding the step of removing the magnetic layer as compared with the conventional method necessitating the step of processing the magnetic layer, using the mask of SOG having SiO as its basic skeleton, and consequently accomplishing the formation of a mask suitable for the ion implantation without increasing the number of steps and as well providing a useful magnetic recording medium exhibiting high surface smoothness and excellent property of head buoyancy.

DISCLOSURE OF THE INVENTION

The present invention provides, as the first aspect thereof, a method for the production of a magnetic recording medium, comprising the steps of forming a magnetic layer on a non-magnetic substrate, injecting atoms into portions of the magnetic layer to cause the portions to be demagnetized or allowed to acquire amorphousness, thereby forming a magnetically separated magnetic recording pattern, the step of injecting the atoms comprising the steps of applying to a surface of the formed magnetic layer an SOG film as a resist, partly removing or thinning the resist, and irradiating the surface with atoms, thereby partly injecting atoms into the magnetic layer through the portions of the magnetic layer from which the resist is removed or in which the resist is thinned.

In the second aspect of the invention that includes the method for the production of a magnetic recording medium set forth in the first aspect, the SOG film during the irradiation with atoms contains an Si—O bond in a ratio of 70% or more based on a total number of bonds in the SOG film.

In the third aspect of the invention that includes the method for the production of a magnetic recording medium set forth in the first aspect, the step of partly removing or thinning the resist comprises the step of using on a surface of the applied resist a stamp having a concavo-convex shape formed on its surface, thereby transferring the concavo-convex shape to the surface of the resist.

In the fourth aspect of the invention that includes the method for the production of a magnetic recording medium set forth in the third aspect, the SOG film immediately prior to the transfer of the concavo-convex shape contains an Si—O bond in a ratio in a range of 10% to 30% based on the total number of bonds in the SOG film.

In the fifth aspect of the invention that includes the method for the production of a magnetic recording medium set forth in first aspect, the step of partly removing or thinning the resist comprises partly etching the surface of the applied resist.

In the sixth aspect of the invention that includes the method for the production of a magnetic recording medium set forth in the first aspect, the resist in the partly removed or thinned portions has a thickness in a range of 0 nm to 150 nm.

In the seventh aspect of the invention that includes the method for the production of a magnetic recording medium set forth in the first aspect, the resist has a removed or thinned part having a width of 100 nm or less and a thick part having a width of 200 nm or less.

In the eighth aspect of the invention that includes the method for the production of a magnetic recording medium set forth in the first aspect, the step of applying the resist is performed on a surface that results from forming a protective film layer on the magnetic layer.

In the ninth aspect of the invention that includes the method for the production of a magnetic recording medium set forth in the first aspect, the atoms to be injected are atoms of one or more members selected from the group consisting of B, P, Si, F, H, C, In, Bi, Kr, Ar, Xe, W, As, Ge, Mo and Sn.

In the tenth aspect of the invention that includes the method for the production of a magnetic recording medium set forth in the ninth aspect, the atoms to be injected are Kr or Si atoms.

In the eleventh aspect of the invention that includes the method for the production of a magnetic recording medium set forth in the first aspect, the magnetic layer has a thickness in a range of 3 to 20 nm.

The invention further provides as the twelfth aspect thereof a magnetic recording medium produced by the method for the production of a magnetic recording medium set forth in any one of the first to eleventh aspects.

The invention further provides as the thirteenth aspect thereof a magnetic recording and reproduction device comprising in combination the magnetic recording medium set forth in the twelfth aspect, a driving part for driving the magnetic recording medium in its recording direction, a magnetic head consisting of a recording part and a regenerating part, means for moving the magnetic head relative to the magnetic recording medium, and a recording and regenerating signal processing means for inputting a signal to the magnetic head and regenerating an output signal from the magnetic head.

This invention, in a magnetic recording medium obtained by forming a magnetic layer as a film on a nonmagnetic substrate and subsequently forming a magnetic recording pattern on the film, enables provision of a magnetic recording medium that secures stability of head buoyancy, possesses excellent ability to separate the magnetic recording pattern, avoids succumbing to the influence of signal interfere between the adjacent patterns and excels in the property of high recording density. Since this magnetic recording medium allows forming a mask capable of easily withstanding the ion injection owing to the use of SOG for the mask and allows omitting a dry etching step intended for the removal of the magnetic layer from the magnetic layer molding die heretofore regarded as involving an extremely complicated process of production, it can immensely contribute to augmenting productivity.

The magnetic recording and reproduction device of this invention excels in the property of head buoyancy, excels in the ability to separate the magnetic recording pattern and avoids succumbing to the influence of signal interference between the adjacent patterns owing to the use of the magnetic recording medium of this invention. Thus, this magnetic recording and reproduction device excels in the property of high recording density.

The above and other objects, characteristic features and advantages of the present invention will become apparent to those skilled in the art from the description to be given herein below with reference to the accompanying drawings.

BEST MODE FOR CARRYING OUT THE INVENTION

This invention, in a method for producing a magnetic recording medium obtained by forming a magnetic layer on a nonmagnetic substrate, then partly injecting atoms into the magnetic layer, thereby demagnetizing or imparting amorphousness to the portions of the magnetic layer having admitted the injection of atoms, and consequently forming a magnetically separated magnetic recording pattern, provides the method by causing the step of partly injecting atoms into the magnetic layer to comprise the steps of applying an SOG film as a resist to the surface of the formed magnetic layer, partly removing or thinning the resist, and irradiating the surface with the atoms, thereby partly injecting the atoms to the magnetic layer through the portions of the removed or thinned resist.

Now, this invention will be described in detail below.

This invention relates to a magnetic recording medium possessing a magnetically separated magnetic recording pattern on at least either of the surfaces of a nonmagnetic substrate and is characterized by producing the nonmagnetic part magnetically separating the magnetic recording pattern part by injecting atoms into the magnetic layer formed in advance. The method of this invention for producing the magnetic recording medium, unlike the conventional method of production, is characterized by not possessing a step for physically separating the magnetic recording pattern directly as by dry etching or stamping during the magnetic separation of the magnetic recording pattern part.

The term "magnetic recording pattern part" as used in this invention embraces the so-called patterned medium having magnetic recording patterns laid with a fixed regularity for each bit, the medium having magnetic recording patterns laid in the shape of a track, and the servo signal patterns.

This invention is preferably applied, by reason of convenience in production, to the so-called discrete magnetic recording medium wherein the magnetically separated magnetic recording patterns comprise the magnetic recording track and the servo signal patterns among other examples cited above.

This invention will be described below by citing, for example, the discrete magnetic recording medium.

Figure 1:
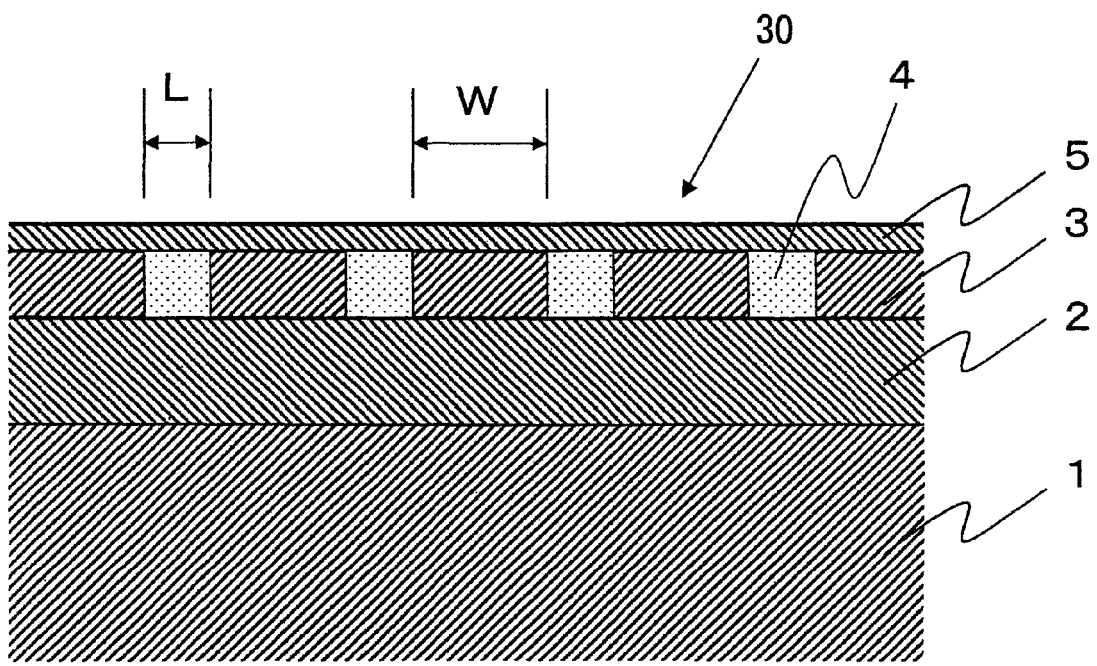
FIG. 1 is a cross section illustrating the construction of a magnetic recording medium obtained in accordance with this invention.

FIG. 1 illustrates an example of the cross-sectional structure of a discrete magnetic recording medium of this invention. A magnetic recording medium 30 of this invention has formed on the surface of a nonmagnetic substrate 1 a soft magnetic layer and an intermediate layer 2, a magnetic layer 3 having a magnetic pattern formed thereon, a nonmagnetic layer 4 and a protective layer 5. It is so configured as to have a lubricating film (not shown) formed on the outermost surface thereof.

For the purpose of heightening the recording density, the magnetic layer 3 possessing the magnetic pattern prefers to have a magnetic part width W of 200 nm or less and a nonmagnetic part width L of 100 nm or less. The track pitch P (=W+L), therefore, falls in the range of 300 nm or less and is narrowed to the fullest possible extent for the sake of heightening the recording density. To satisfy this purpose, the width of the resist in the thick part is required to be 200 nm or less similarly to the part W and the width of the resist in the thin part is required to be 100 nm or less similarly to the width L.

The nonmagnetic substrate to be used for this invention may be any of nonmagnetic substrates, such as Al alloy substrates using Al—Mg alloys having Al as a main component, substrates of ordinary soda glass, aluminosilicate-based glass and crystallized glass, and substrates made of silicon, titanium, ceramics and various resins. Among other examples cited above, the Al alloy substrates, substrates made of glass, such as crystallized glass, and silicon substrate are used particularly favorably. The average surface roughness (Ra) of such a substrate prefers to be 1 nm or less, more favorably 0.5 nm or less, and particularly favorably 0.1 nm or less. This invention contemplates forming on the surface of this substrate an FeCoB layer as a soft magnetic layer and a Ru layer as an intermediate layer, for example. The soft magnetic layer and the intermediate layer are the layers that are necessitated by the vertical magnetic recording medium.

Though the magnetic layer of this invention may be an in-plane magnetic recording medium or a vertical magnetic recording medium, it prefers to be a vertical magnetic recording layer for the purpose of realizing as high recording density as permissible. The magnetic recording layer prefers to be formed of an alloy having Co as a main component.

As the magnetic recording layer for use in the in-plane magnetic recording medium, for example, the stacked structure consisting of a nonmagnetic CrMo under layer and a ferromagnetic CoCrPtTa magnetic layer can be utilized.

As the magnetic recording layer for use in the vertical magnetic recording medium, a stacked structure of a lining layer made of a soft magnetic FeCo alloy (such as FeCoB, FeCoSiB, FeCoZr, FeCoZrB or FeCoZrBCu), FeTa alloy (such as FeTaN or FeTaC) and Co alloy (such as CoTaZr, CoZrNB or CoB), an orientation controlling film made of Pt, Pd, NiCr or FiFeCr, optionally an intermediate film made of Ru, and a magnetic layer made of a 70Co-15Cr-15Pt alloy (an alloy composed of 70 atom % of Co, 15 atom % of Cr, and 15 atom % of Pt, the same applies herein below) and a 70Co-5Cr-15Pt-10$SiO_2$ alloy can be utilized.

The magnetic recording medium has a thickness of 3 nm or more and 20 nm or less, preferably 5 nm or more and 15 nm or less. The magnetic recording medium may be so formed as to obtain sufficient head input and output befitting the kind of magnetic alloy and the stacked structure. The magnetic layer is required to possess a film thickness exceeding a certain level for the purpose of obtaining an output exceeding a fixed degree during the course of regeneration, while the parameters expressing the recording and reproducing properties are generally degraded in accordance as the output increases. Thus, the film thickness must be optimally set.

Ordinarily, the magnetic recording layer is obtained in the form of a thin film by the sputtering method.

In this invention, a magnetically separated magnetic recording track and servo signal patterns are formed in the magnetic recording medium. Though the step of forming these components may be performed directly after the step of forming the magnetic recording layer, it may take place after the formation of the protective film layer 5 and before the formation of the lubricating layer.

For the protective film layer 5, carbonaceous layers of carbon (C), hydrogenerated carbon ($H_xC$), carbon nitride (CN), amorphous carbon and silicon carbide (SiC) and protective film layer materials, such as $SiO_2$, $Zr_2O_3$ and TiN which are in ordinary use are available. The protective film layer may be composed of two or more layers.

The protective film layer 5 is required to have a film thickness of 10 nm or less. This is because the distance between the head and the magnetic layer becomes unduly large and the input-output signal of sufficient intensity becomes unattainable when the film thickness of the protective film layer exceeds 10 nm. Generally, the protective film layer is formed by the sputtering method or the CVD method.

The protective film layer prefers to have a lubricating layer formed thereon. As examples of the lubricating agent to be used for the lubricating layer, fluorine-based lubricants, hydrocarbon-based lubricants and the mixtures thereof may be cited. Generally, the lubricating layer is formed in a thickness in the range of 1 to 4 nm.

Now, the step of forming the magnetically separated magnetic recording tracks and the servo signal patterns in the magnetic recording layer of this invention will be specifically described below. This step may be performed immediately after the step of disposing the magnetic recording layer or after the protective film layer is disposed on the surface of the magnetic recording layer. The following description concerns an example of performing the step of forming the magnetically separated magnetic recording tracks and the servo signal patterns in the magnetic recording layer after the protective film layer is disposed on the surface of the magnetic recording layer.

This invention forms a film of 70Co-5Cr-15Pt-10$SiO_2$ alloy as the magnetic layer and a film of carbon as the protective layer. Thereafter, the resist is applied to the surface of the protective layer and the magnetically separated magnetic recording tracks and the servo signal patterns are formed according to the photolithographic technique.

This invention is characterized by using SOG as the resist necessary for this technique. The SOG is the acronym for 'spin-on-glass,' which indicates the material for forming a glass film by the technique of spin coating. This invention uses the SOG as a masking material during the partial injection of atoms into the magnetic layer by appropriating the characteristic of the application of liquid inherent in the SOG. To be specific, the SOG exhibits high resistance to the etching during the injection of ions, enables its softness to be controlled by heating, and excels in the property of retaining its shape during the transfer of the concavo-convex shape to the surface by stamping. The SOG includes the silicate-based SOG, the methyl siloxane-based SOG and the high methyl siloxane-based SOG, which are invariably available.

This invention is characterized by a procedure that comprises partly removing or thinning the resist and irradiating the resultant surface of the resist with atoms, thereby allowing partial injection of the atoms into the magnetic layer through the portions of the resist so removed or thinned.

When, during the step of partial injection of atoms to the magnetic layer, the resist is left behind only in the portions of the magnetic layer not subjected to injection of atoms and the resist is completely removed from the portions subjected to injection of atoms, though the atoms are efficiently injected into the magnetic layer, it is not inconceivable that this treatment will inflict damage on the magnetic layer or will expose the magnetic layer to unexpected etching. The method that consists of perfectly removing the resist and then injecting the atoms is rendered practicable by such a contrivance as, for example, terminating the injection before the protective layer is perfectly removed by etching or forming the protective layer in an ample thickness in anticipation of the decrease. Preferably, the resist in the portions of the magnetic layer subjected to injection of atoms is left behind in a decreased film thickness instead of being perfectly removed. This procedure results in remarkably alleviating the damage on the portions of the magnetic layer subjected to the injection of atoms, accomplishing the demagnetization of or the impartation of amorphousness to the magnetic layer in the portions mentioned above, and as well maintaining the surface smoothness of the portions.

The method of this invention for partly removing or thinning the resist is accomplished by using on the surface of the applied resist a stamp having a concavo-convex shape formed thereon and transferring the concavo-convex shape to the resist surface. For example, by applying a liquid resist to the surface of the protective film and subsequently pressing the surface with a stamp having the concavo-convex shape formed thereon before the applied resist is perfectly hardened, it is made possible to transfer the concavo-convex shape to the resist surface. Then, in the case of optically transferring an etching pattern by the photolithographic technique and thereafter etching the optically transferred pattern, the method that comprises stopping the etching before the etching is perfectly terminated and allowing the resist in the etched part to remain in a thinned state.

This invention uses the aforementioned method for partly removing or thinning the resist and the resultant film thickness of the resist is decided by the energy of the ion beam to be used for the injection of atoms. In the portions of thick resist, the projected atoms do not reach the surface of the magnetic recording medium. On the other hand, in the portions of removed or thinned resist, the projected atoms reach the magnetic layer and demagnetize the portions or impart amorphousness thereto. The irradiation of the surface of the magnetic recording medium with the atoms is required to avoid inflicting damage on the smoothness of the surface. The resist in the portions of large thickness that satisfy this requirement prefers to have a thickness in the range of 10 nm to 1000 nm. The resist in the removed or thinned portions has a thickness preferably in the range of 0 nm to 140 nm and more preferably in the range of 5 nm to 100 nm.

In this invention, the SOG film serving as the resist during the injection of atoms prefers to contain the Si—O bond in a ratio of 70% or more based on the total number of bonds including the O—H bonds in the SOG film. The SOG that is normally in a liquid state can be gradually hardened when it is applied to the surface of a substrate as by spin coating and then the moisture and organic substances contained therein are scattered by application of heat. When the SOG is hardened, its configuration is changed to a reticular crosslinked structure of Si and O as shown by the formula 1 below or a configuration having an $SiO_2$ unit, such as glass or quartz, as a main component. The configuration of this kind exhibits high resistance to the etching during the implantation of ions and can be advantageously used as the mask material during the process of partly injecting atoms into the magnetic layer, thereby demagnetizing the portions of the magnetic layer subjected to the injection of atoms or imparting amorphousness thereto. Incidentally, the number of Si—O bonds contained in the SOG (the ratio based on the total number of bonds) can be determined by the Electron Spectroscopy for Chemical Analysis (ESCA).

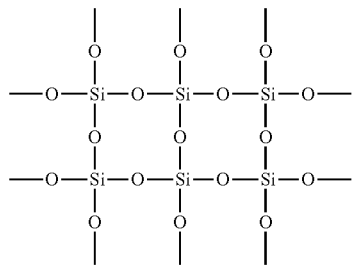

Formula 1

In this invention, during the process of applying the SOG onto the magnetic layer, using a stamp having a concavo-convex shape formed on its surface and transferring the concavo-convex shape to the surface of the magnetic layer, the SOG immediately prior to the transfer prefers to contain the Si—O bonds in a ratio in the range of 10% to 30% based on the total number of bonds in the SOG. The SOG is normally in a liquid state as described previously and can be gradually hardened by applying the SOG to the surface of a substrate as by spin coating and subsequently causing the moisture and the organic substances contained therein to be scattered as by application of heat. This invention, by causing the number of Si—O bonds contained in the SOG to fall in the range of 10% to 30% based on the total number of bonds in the SOG immediately prior to the transfer of the concavo-convex shape to the SOG surface, is enabled to enhance the ability to transfer the concavo-convex shape to the SOG and as well augment the property of maintaining the resistance to etching and the concavo-convex shape during the injection of ions into the hardened SOG.

In this invention, when the projection of atoms to the surface is implemented by using the ion beam method, the atoms are injected only into the parts intervening between the magnetic recording tracks and the servo signal patterns. This invention, prior to injecting atoms into the magnetic recording layer, ionizes the atoms for the purpose of accelerating the atoms. It is inferred that the ions implanted into the magnetic recording layer are in a neutralized state.

This invention is characterized by the fact that a discrete track magnetic recording medium is produced by forming the nonmagnetic part magnetically separating the magnetic recording tracks and the servo signal pattern part in consequence of demagnetizing the magnetic layer by the injection of atoms to the magnetic layer formed in advance. By producing the discrete track magnetic recording medium by the use of this method, it is made possible to decrease the coercive force and the residual magnetization of the regions between the magnetic tracks to the maximum, eliminate the blurring during the course of the magnetic recording, and enable providing a magnetic recording medium of high surface recording density. This is because the injection of atoms into the magnetic layer results in changing the magnetic layer to a nonmagnetic material, depriving the magnetic layer of magnetism due to the change of the crystalline structure of the magnetic layer, and causing the magnetic layer to lose magnetism by becoming amorphous as described specifically herein below.

By producing the discrete track-type magnetic recording medium as described above, it is rendered possible to decrease the coercive force and the residual magnetization in the regions between the magnetic tracks to the maximum, eliminate the blurring during the course of the magnetic recording, and enable provision of a magnetic recording medium of high surface recording density.

This invention is further characterized by the fact that the nonmagnetic part magnetically separating the magnetic recording tracks and the servo signal pattern part is formed by homogenously injecting atoms into the formed magnetic layer in the direction of thickness of the magnetic layer, thereby imparting amorphousness to the magnetic layer.

The expression "imparting amorphousness to the magnetic layer" as used in this invention refers to causing the magnetic layer to assume a concavo-convex atomic arrangement destitute of long-distance order and more specifically refers to a state in which microcrystalline particles falling short of 2 nm are arranged randomly. For the purpose of analytically confirming the state of this atomic arrangement, the X ray diffraction or the electron diffraction reveals a state in which a peak expressing a crystalline surface is not recognized and only a halo is recognized.

By using this method for producing the discrete track magnetic recording medium, thereby decreasing the coercive force and the residual magnetization in the regions between the magnetic tracks to the maximum, it is made possible to eliminate the blurring during the course of the magnetic recording and enable provision of a magnetic recording medium having high surface recording density.

The atoms to be injected by the use of the ion beam method, for example, are preferably the atoms of one or more members selected from the group consisting of B, P, Si, F, H, C, In, Bi, Kr, Ar, Xe, W, As, Ge, Mo and Sn, more preferably the atoms of one or more members selected from the group consisting of B, P, Si, F, H and C or the atoms of one or more members selected from the group consisting of Si, In, Ge, Bi, Kr, Xe and W, and most preferably the atoms of Si and Kr. When the atoms of 0 and N are used as disclosed in JP-A HEI 5-205257 for the purpose of injection, since O and N have small atomic radii, their injection has a small effect and suffers the state of magnetization to persist in the region between the magnetic tracks. When the atoms of O and N are used for the injection, they nitride or oxidize the magnetic layer. Their injection, therefore, results in increasing the coercive force in the regions between the magnetic tracks and inducing the phenomenon of blurring during the course of writing information in the magnetic track part. That is, the use of these atoms, unlike the atoms used for the injection of this invention, renders it impossible to demagnetize the magnetic layer or the impart amorphousness thereto.

This invention produces the magnetic recording medium by forming on the magnetic layer a magnetic pattern designed in conformity with the distance between the implanted tracks, then removing the resist and forming the protective layer again, and subsequently applying the lubricating material.

This invention prefers to inject the atoms into the magnetic layer subsequent to the formation of the protective layer on the magnetic layer. The adoption of this procedure results in obviating the necessity of forming the protective layer subsequent to the injection of atoms, simplifying the process of production and obtaining the effect of enhancing productivity and decreasing the contamination during the process of producing the magnetic recording medium. Incidentally, this invention allows the injection of atoms to take place subsequent to the formation of the magnetic layer or prior to the formation of the protective layer to form on the magnetic layer the nonmagnetic part magnetically separating the magnetic recording tracks and the servo signal pattern part.

For the injection of atoms of Si, for example, according to the aforementioned ion beam, the ion implanter that is commercially available is used to inject the atoms into the magnetic layer. Since this invention is aimed at injecting the atoms into the magnetic layer, thereby imparting amorphousness to the crystals in the relevant part and as well causing the injected atoms to be homogeneously distributed in the amorphous part, it requires the depth of injection to be homogenously in the direction of the magnetic recording layer. The depth of the injection of atoms is decided at a proper time by the accelerated voltage in the ion implanter, depending on the depth to be reached by the injection.

The formation of a pattern subsequent to the application of resist is fulfilled, as described above, by directly joining the stamper to the surface of the applied resist and pressing it against the surface with high pressure, thereby forming on the resist surface the concavo-convex shape in the form of tracks. Otherwise, the concavo-convex pattern that is formed by etching a thermosetting resin or a UV-setting resin, for example, may be used.

The stamper to be used for the aforementioned process may be obtained by having a fine track pattern formed on a metal plate by the electron-beam lithography method, for example. The material of the metal plate requires hardness and durability capable of withstanding the process. Though Ni, for example, can be used, the kind of material is irrelevant so long as the material conforms to the object mentioned above. On the stamper, the patterns of servo signals, such as burst patterns, gray-code patterns and preamble patterns, are formed besides the tracks for recording ordinary data.

In the removal of the resist, the resist on the surface and part of the protective layer are removed by using the technique of dry etching, reactive ion etching or ion milling. In consequence of this treatment, the magnetic layer having the magnetic pattern formed thereon and part of the protective layer are left behind. By selecting the conditions of the treatment, it is made possible to attain complete removal till the protective layer and allow retention of only the magnetic layer having the pattern formed thereon.

Of the component layers of the magnetic recording medium, the layers excluding the protective film layer may be formed according to the RF sputtering method or the DC sputtering method that is generally available as a method for forming a film.

On the other hand, the protective film layer is formed generally by a method producing a thin film of diamond like carbon in accordance with the P-CVD, though not exclusively.

Figure 2:
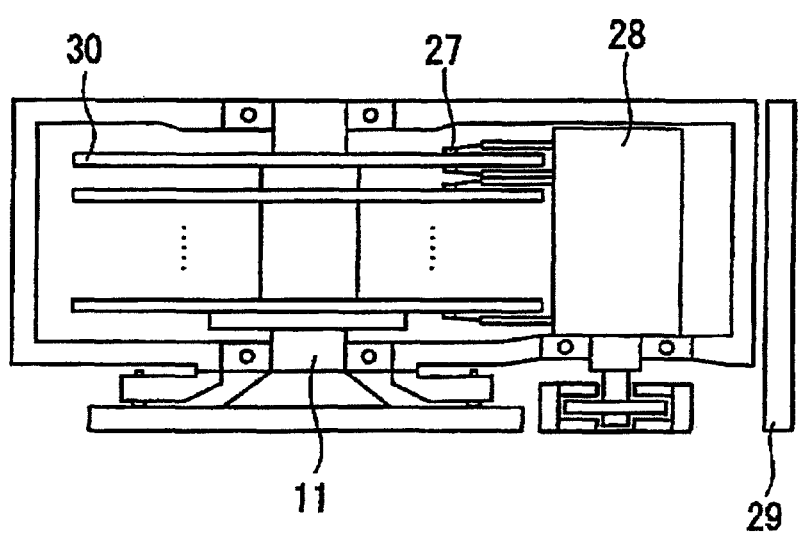
FIG. 2 is an explanatory view showing the construction of a magnetic recording and reproduction device of this invention.

The construction of the magnetic recording and reproduction device of this invention is illustrated in FIG. 2. The magnetic recording and reproduction device of this invention comprises in combination the magnetic recording medium 30 of this invention and a recording and reproducing signal system 29 resulting from combining a medium driving part 11 for driving the medium in its recording direction, a magnetic head 27 consisting of a recording part and a reproducing part, a head driving part 28 for moving the magnetic head 27 relative to the magnetic recording medium 30, and a recording and reproducing signal processing means for inputting a signal to the magnetic head 27 and reproducing an output signal from the magnetic head 27. By combining these components, it is made possible to construct the magnetic recording device having a high recording density. By subjecting the recording tracks of the magnetic recording medium to magnetically discrete processing, it is made possible to have the regenerating head and the recording head operated in nearly the same width, while it has been ordinary heretofore to give the regenerating head a smaller width than the recording head to cope with the elimination of the influence of the magnetization transition region of the track edge part. It is consequently rendered possible to obtain a sufficient regeneration output and a high SNR.

Further, by constructing the regenerating part of the magnetic head with a GMR head or a TMR head, it is made possible to obtain sufficient signal strength even at high recording density and realize a magnetic recording device possessing a high recording density. By causing the amount of buoyancy of the magnetic head to fall in a range of 0.005 μm to 0.020 μm, which is higher than the conventional range, it is made possible to increase the output, obtain a high device SNR and allow provision of a magnetic recording device possessing a large capacity and exhibiting high reliability. A sufficient SNR is obtained even when the recording and the reproducing are performed at a track density of 100 k tracks/inch or more, a linear recording density of 1000 k bits/inch or more, and a recording density of 100 G bits per square inch or more.

Now, this invention will be specifically described below by reference to an example. This invention, however, is not limited in any sense to the example.

EXAMPLE 1

A vacuum chamber having a glass substrate for an HD set therein was preparatorily evacuated to a vacuum of $1.0 \times 10^{-5}$ Pa or less. The glass substrate used herein had as its material a crystallized glass composed of $Li_2Si_2O_5$, $Al_2O_3$—$K_2O$, $MgO$—$P_2O_5$ and $Sb_3O_3$—$ZnO$ and had an outside diameter of 65 mm, an inside diameter of 20 mm and an average surface roughness (Ra) of 2 Å.

On the glass substrate, a soft magnetic layer of FeCoB, an intermediate layer of Ru and a magnetic layer of 70Co-5Cr-15Pt-10SiO$_2$ alloy were stacked by using the DC sputtering method and a C (carbon) protective film layer and a fluorine-based lubricating film were stacked by using the P-CVD method sequentially in the order mentioned. The FeCoB soft magnetic layer measured 600 Å, the Ru intermediate layer 100 Å, the magnetic layer 150 Å and the C (carbon) protective film layer an average of 4 nm respectively in film thickness. Thereafter, a magnetic pattern was formed on the magnetic layer. To be specific, a methyl siloxane-based SOG was applied by spin coating on the protective film layer. The applied layer of the SOG had a film thickness of 400 nm. This SOG contained an Si—O bond in a ratio of 10% based on the total number of bonds in the SOG (the same applies herein below) This SOG was thermally hardened till the Si—O bond contained in the SOG was heightened to 25% based on the total number of bonds contained in the SOG.

A stamp made of an Ni alloy and containing a pattern 200 nm in depth was pressed on the surface of the SOG to transfer the pattern to the surface. After the transfer, the convex part of the resist had a thickness of 250 nm and the concave part of the resist had a thickness of 50 nm.

Thereafter, the SOG was further thermally hardened till the Si—O bond contained in the SOG was heightened to 80% based on the total number of bonds contained in the SOG. Subsequent to this thermal hardening, the convex part of the resist had a thickness of 150 nm and the concave part of the resist had a thickness of 30 nm.

Subsequently, $Ar^+$ atoms were implanted by the ion beam method. The conditions, such as the amount of implantation and the accelerated voltage used for the ion beam were set as shown in Table 1 below. The magnetic recording medium consequently obtained had a structure illustrated in FIG. 1. The magnetic layer had a width W of 100 nm and the non-magnetic layer had a width L of 100 nm.

Incidentally, the amount of implantation of ion beam and the condition of accelerated voltage are required to be set in advance by a preliminary experiment. The condition for demagnetizing the magnetic layer and the condition for imparting amorphousness to the magnetic layer are also required to be set in advance by the X-ray diffraction determination and the electron-beam diffraction measurement, for example.

The magnetic recording medium produced in this example was rated for electromagnetic conversion property by using a spin stand. As regards the head for this rating, a vertical recording head was used for recording and a TuMR head was used for reading. The SNR value and the 3T-squash were determined when a signal of 750 kFCI was recorded. The magnetic recording medium obtained by the example was consequently found to excel in RW properties, such as the SNR and the 3T-squarh. This excellence is explained by supposing that the property of head buoyancy was stabilized, that the read-write could be performed at a prescribed height of buoyancy and that the magnetized state of the regions between the magnetic tracks were perfectly vanished. Owing to the confirmation of the RW properties, such as the SNR and the 3T-squash, it was ascertained that the sample of the example allowed separation between the tracks by the nonmagnetic part and that the magnetic pattern of the magnetic part and the nonmagnetic pattern conforming with the shape of pattern of the concavo-convex resist was formed in the magnetic layer part of the sample of the example in consequence of the ion implantation in the form of an ion beam.

After the determination of the property of electromagnetic conversion was terminated, the magnetic recording medium of this example was tested for surface roughness by using an AFM. By using the AFM made by Digital Instruments Corporation, nonmagnetic substrates prepared for a perpendicular recording medium in the example and a comparative example were rated for surface roughness (Ra) in a visual field of 10 µm. The results were as shown in Table 1 below. The magnetic recording medium of this example showed surface roughness of a remarkably low value, which allows inference that the buoyancy of the head was stabilized.

The magnetic recording medium of the example was evaluated for the property of glide avalanche. The evaluation was implemented with a device made by Sony/Tektronix Corporation and sold under the product code of DS4100 and using a 50% slider head made by Glidewrite Inc. The results are shown in Table 1 below. The magnetic recording medium of this example showed low glide avalanche, which allows inference that it excelled in the property of buoyancy of head.

TABLE 1

| Ion-beam Ar accelerated Voltage/duration of Irradiation | SNR (dB) | 3T-squash (5%) | Ra (nm) | Glide avalanche (m) |
|---|---|---|---|---|
| Example 50 keV/600 seconds | 12.5 | 83.1 | 0.31 | 5.3 |

INDUSTRIAL APPLICABILITY

This invention is capable of providing a magnetic recording medium that secures stability of buoyancy of a head, possesses an excellent ability to separate a magnetic recording pattern, avoids succumbing to the influence of the signal interference between the adjacent patterns and excels in the property of high recording density. It contributes greatly to the enhancement of productivity because it can obviate the necessity of performing a dry etching step that is directed to the removal of the magnetic recording layer of the magnetic layer die heretofore regarded as entailing an extremely complicated process of production.

The invention claimed is:

1. A method for the production of a magnetic recording medium, comprising the steps of forming a magnetic layer on a nonmagnetic substrate, injecting atoms into portions of the magnetic layer to cause the portions to be demagnetized or allowed to acquire amorphousness, thereby forming a magnetically separated magnetic recording pattern, the step of injecting atoms comprising the steps of applying to a surface of the formed magnetic layer an SOG film as a resist, partly removing or thinning the resist, and irradiating the surface with atoms, thereby partly injecting atoms into the magnetic layer through the portions of the magnetic layer from which the resist is removed or in which the resist is thinned, wherein the atoms to be injected are atoms of one or more members selected from the group consisting of B, P, Si, F, H, C, In, Bi, Kr, Ar, Xe, W, As, Ge, Mo and Sn, wherein the step of removing or thinning the resist comprises the steps of using on a surface of the applied resist a stamp having a concavo-convex shape formed on its surface, thereby transferring the concavo-convex shape to the surface of the resist, wherein the SOG film immediately prior to the transfer of the concavo-convex shape contains an Si—O bond in a ratio in a range of 10% to 30% based on the total number of bonds in the SOG film, and the resist in the partly removed or thinned portions has a thickness in a range of 5 nm to 150 nm.

2. A method for the production of a magnetic recording medium according to claim 1, wherein the SOG film during the irradiation with atoms contains an Si—O bond in a ratio of 70% or more based on a total number of bond in the SOG film.

3. A method for the production of a magnetic recording medium according to claim 1, wherein the step of partly removing or thinning the resist comprises partly etching the surface of the applied resist.

4. A method for the production of a magnetic recording medium according to claim 1, wherein the resist in the partly removed or thinned portions has a thickness in a range of 5 nm to 100 nm.

5. A method for the production of a magnetic recording medium according to claim 1, wherein the resist has a removed or thinned part having a width of 100 nm or less and a thick part having a width of 200 nm or less.

6. A method for the production of a magnetic recording medium according to claim 1, wherein the step of applying the resist is performed on a surface that results from forming a protective film layer on the magnetic layer.

7. A method for the production of a magnetic recording medium according to claim 1, wherein the atoms to be injected are Kr or Si atoms.

8. A method for the production of a magnetic recording medium according to claim 1, wherein the magnetic layer has a thickness in a range of 3 to 20 nm.

* * * * *